Aug. 15, 1939.  C. T. BOLEN  2,169,511
THERMAL COVER
Filed Feb. 15, 1938
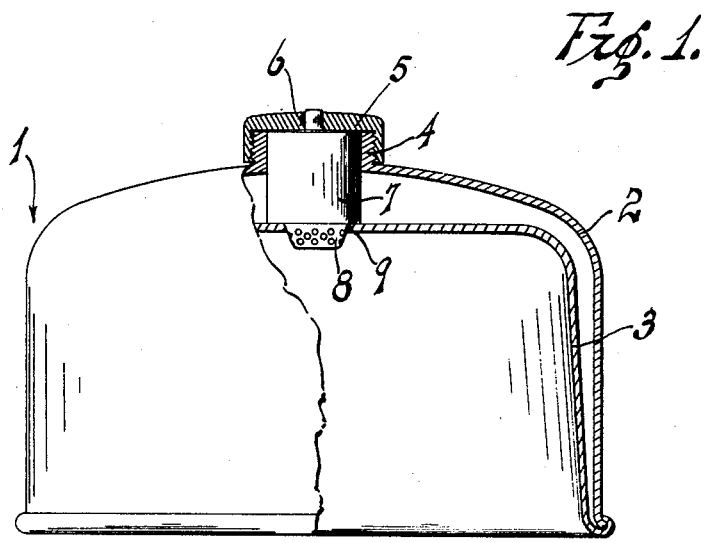
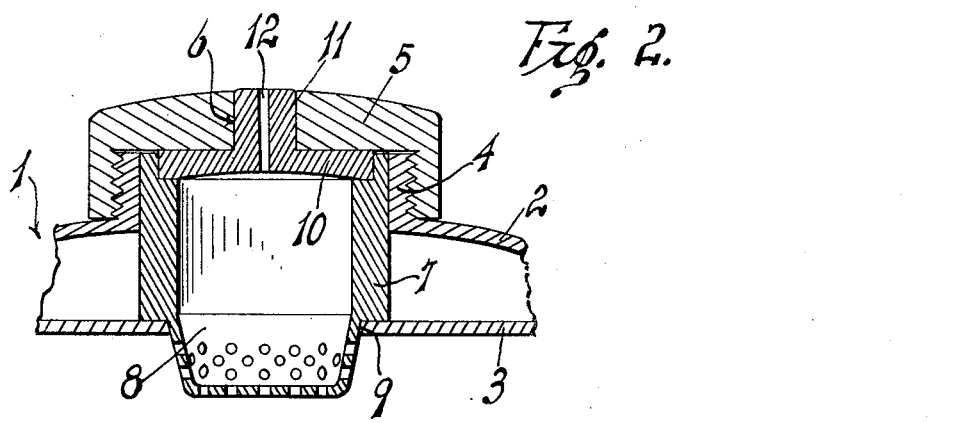
INVENTOR
CARL T. BOLEN.

Patented Aug. 15, 1939

2,169,511

UNITED STATES PATENT OFFICE 2,169,511

THERMAL COVER

Carl T. Bolen, Long Beach, Calif.

Application February 15, 1938, Serial No. 190,610

5 Claims. (Cl. 62—91.5)

This invention relates to a thermal cover which is placed over either hot or cold food dishes for the purpose of maintaining the temperature of such food dishes.

An object of my invention is to provide a novel thermal cover including a double wall, which acts as an insulator, or as a reservoir for the purpose of retaining condensed steam, which rises from hot foods.

Another object is to provide a novel thermal cover provided with an ice receiving cup, a portion of said cup protruding through the inner wall, for the purpose of more effectively chilling the food, or maintaining the temperature of cold foods enclosed by the cover.

Still another object is to provide a novel ice retaining cup which is provided with a means to circulate cold air over the chilling medium and thence into the refrigeration chamber.

Other objects, advantages and features of invention may appear from the accompanying drawing, the subjoined detailed description and the appended claims.

In the drawing:

Figure 1 is a side elevation of the thermal cover, with parts broken away to show interior construction.

Figure 2 is an enlarged fragmentary transverse sectional view of the upper portion of the thermal cover, and the ice retaining cup.

Referring more particularly to the drawing, the thermal cover 1 consists of an outer wall or shell 2, and an inner wall 3 which is spaced from the wall 2. A threaded boss 4 rises from the top of the wall 2 and in the case of a single unit cover, this boss is arranged centrally of the cover. A cap 5 screws on to the boss 4 and this cap is provided with a central hole 6, the purpose of which is further described.

A cup 7 fits within the boss 4 and rests upon the inner wall 3, substantially as shown in Figure 2. This cup is provided with a perforated sump or bottom 8, which extends through an opening 9 in the wall 3. A lid 10 fits into the cup 7 and this lid is provided with an upwardly extending stem 11, which accurately fits the hole 6. A bleed hole 12 extends through the stem 11 for the purpose of permitting the circulation of air over the chilling medium within the cup 7.

I prefer that the chilling medium shall be solid carbon dioxide, since its temperature is lower than frozen water, although other chilling mediums might be used if desired. The cup 7 and lid 10 are preferably formed of an insulating material so as to prevent the excessive cooling of the dead air space between the walls 2 and 3.

In maintaining the temperature of cold dishes, I find that the temperature within the cover can be maintained at a relatively low point for a considerable period of time. This is attributal to the effective circulation of air over the carbon dioxide within the cup 7, and also the direct communication of the air within the thermal cover with the carbon dioxide.

When the thermal cover is to be used with hot dishes the cup 7 is removed which leaves a relatively large vent at the top of the thermal cover, through which the moist steam can pass. This steam will tend to condense on the inner surface of the outer wall 2 and will drop into the space between the walls 2, 3. This prevents the condensed water from dropping on to the food.

When the cap 5 is screwed tightly on to the boss 4 it will press against the lid 10, thus pressing the cup 7 tightly against the inner wall, and thus sealing the seat between the cup and the inner wall 3.

Having described my invention, I claim:

1. A thermal cover for foods comprising spaced outer and inner walls, a cup removably mounted in the cover, said cup being positioned between the inner and outer walls, said inner wall having an opening therein, and said cup having perforations in the bottom thereof, said perforated bottom fitting in the opening in the inner wall.

2. A thermal cover for foods comprising spaced outer and inner walls, a cup removably mounted in the cover, said cup being positioned between the inner and outer walls, said inner wall having an opening therein, and said cup having perforations in the bottom thereof, said perforated bottom fitting in the opening in the inner wall, a lid on the cup having a vent therein and a cap mounted on the cover and engaging the cup, whereby the cup is held in position.

3. A thermal cover for foods comprising spaced inner and outer walls, a boss rising from the outer wall, a cap detachably mounted on the boss, a cup fitted within the boss, and resting on the inner wall, said inner wall having a hole therethrough below the cup, said cup having a perforated bottom fitting in the hole in the inner wall, a lid fitted in the cup, a stem rising from the lid through the cap, said stem having a vent hole therein.

4. A thermal cover for foods comprising spaced inner and outer walls, a boss rising from the outer wall, a cap detachably mounted on the boss, a cup fitted within the boss, and resting on the inner wall, said inner wall having a hole therethrough, a sump on the cup, protruding through said hole, said sump being perforated, a lid fitted in the cup, a stem rising from the lid through the cap, said stem having a vent hole therethrough.

5. A thermal cover for foods comprising spaced outer and inner walls, a cup in the cover, said cup being positioned between the inner and the outer walls, said cup having holes therein, said holes being open to the area within the inner wall of the cover.

CARL T. BOLEN.